(12) United States Patent
Sweet et al.

(10) Patent No.: US 10,092,870 B2
(45) Date of Patent: Oct. 9, 2018

(54) FILTER ASSEMBLY

(71) Applicant: TRANE INTERNATIONAL INC., Davidson, NC (US)

(72) Inventors: David B. Sweet, Lexington, KY (US); Thomas Nathan McLain, Lexington, KY (US); Joseph A. Wells, Versailles, KY (US); Ying-Zhong Zhang, Lexington, KY (US); Donald F. Novak, Nicholasville, KY (US); Aaron Decker, Lexington, KY (US); James T. Little, Winchester, KY (US)

(73) Assignee: TRANE INTERNATIONAL INC., Davidson, NC (US)

( * ) Notice: Subject to any disclaimer, the term of this patent is extended or adjusted under 35 U.S.C. 154(b) by 186 days.

(21) Appl. No.: 15/161,995

(22) Filed: May 23, 2016

(65) Prior Publication Data
US 2016/0339375 A1    Nov. 24, 2016

Related U.S. Application Data

(60) Provisional application No. 62/165,522, filed on May 22, 2015.

(51) Int. Cl.
*B01D 46/00* (2006.01)
*B01D 46/02* (2006.01)

(52) U.S. Cl.
CPC ..... *B01D 46/0005* (2013.01); *B01D 46/0019* (2013.01); *B01D 46/02* (2013.01); *B01D 2265/00* (2013.01); *B01D 2265/06* (2013.01)

(58) Field of Classification Search
CPC ............ B01D 46/0005; B01D 2265/06; B01D 2265/00
See application file for complete search history.

(56) References Cited

U.S. PATENT DOCUMENTS

| | | | | | |
|---|---|---|---|---|---|
| 3,289,394 | A | * | 12/1966 | Young | B01D 46/02 210/485 |
| 3,830,042 | A | * | 8/1974 | MacDonnell | B01D 46/02 55/341.4 |
| 4,197,099 | A | * | 4/1980 | Lundberg | B01D 46/02 55/378 |
| 4,300,927 | A | * | 11/1981 | Day | B01D 46/023 55/378 |
| 2002/0194824 | A1 | * | 12/2002 | Clayton | B01D 46/0005 55/482 |
| 2004/0163370 | A1 | * | 8/2004 | Haufe | B01D 46/0005 55/483 |
| 2005/0178268 | A1 | * | 8/2005 | Beier | B01D 46/002 95/286 |
| 2006/0272302 | A1 | * | 12/2006 | Stock | B01D 46/0005 55/483 |

(Continued)

*Primary Examiner* — Amber R Orlando
*Assistant Examiner* — Brittany Precht
(74) *Attorney, Agent, or Firm* — Hamre, Schumann, Mueller & Larson, P.C.

(57) ABSTRACT

An assembly is disclosed. The assembly includes a filter frame including one or more cutouts for permitting airflow therethrough. The assembly further includes one or more vertical support members and one or more horizontal support members, wherein the one or more vertical support members and the one or more horizontal support members are fixed to a first side of the filter frame.

17 Claims, 6 Drawing Sheets

(56) References Cited

U.S. PATENT DOCUMENTS

| | | | | |
|---|---|---|---|---|
| 2007/0220844 A1* | 9/2007 | Yamazaki | B01D 46/0005 55/341.6 |
| 2008/0066436 A1* | 3/2008 | Magee | B01D 46/0002 55/497 |
| 2009/0049810 A1* | 2/2009 | Green | B01D 46/002 55/378 |
| 2009/0107088 A1* | 4/2009 | Sundvik | B01D 46/0002 55/350.1 |
| 2012/0079798 A1* | 4/2012 | Rafi | B01D 46/0005 55/484 |
| 2012/0311978 A1* | 12/2012 | Crabtree | A01K 1/0047 55/385.2 |
| 2013/0318936 A1* | 12/2013 | Ball | B01D 46/001 55/483 |
| 2014/0096493 A1* | 4/2014 | Kelmartin | B01D 46/0002 55/482 |
| 2014/0130468 A1* | 5/2014 | Jackson | B01D 46/0005 55/482 |
| 2014/0237957 A1* | 8/2014 | Kohn | B01D 46/0016 D46/16 |
| 2015/0000236 A1* | 1/2015 | Yang | B01D 46/0019 D46/19 |
| 2015/0082988 A1* | 3/2015 | Butler | B01D 46/0005 96/226 |
| 2015/0101486 A1* | 4/2015 | Castro | B01D 46/521 95/287 |
| 2015/0128540 A1* | 5/2015 | Eyers | B01D 46/023 55/379 |
| 2015/0224433 A1* | 8/2015 | Lans | B01D 46/0005 55/482 |
| 2016/0030871 A1* | 2/2016 | Krause | B01D 46/0005 96/108 |
| 2016/0288036 A1* | 10/2016 | Wieland | B01D 46/0093 |
| 2016/0339375 A1* | 11/2016 | Sweet | B01D 46/0005 |
| 2017/0050135 A1* | 2/2017 | Aota | F02C 7/052 |
| 2017/0128869 A1* | 5/2017 | Simmons | B01D 46/0005 |
| 2017/0136483 A1* | 5/2017 | Slama | B01D 46/0001 |
| 2017/0189843 A1* | 7/2017 | Turbett | B01D 46/0005 |
| 2017/0363318 A1* | 12/2017 | White | B01D 46/0009 |

\* cited by examiner

FILTER ASSEMBLY

FIELD

This disclosure relates generally to air handling in a heating, ventilation, and air conditioning (HVAC) system. More specifically, this disclosure relates to a filter rack assembly for filters disposed within a duct in an HVAC system.

BACKGROUND

An air handling system for a heating, ventilation, and air conditioning (HVAC) system generally includes an air filter(s) for removing particulates from the airflow prior to the airflow being provided to an interior space of a building. In some air handling systems, the air filter(s) may be high-efficiency particulate air (HEPA) filters. The air filter(s) are inserted into a cabinet which essentially functions as a duct for the airflow. To ensure the air filter(s) are appropriately filtering air, it is generally necessary to seal any gaps between a filter mounting rack which holds the air filter(s) in place and the cabinet in which the air filter(s) are placed. It may be difficult to properly seal the gaps to prevent airflow from bypassing the air filter(s) due to, for example, manufacturing tolerances, or the like.

SUMMARY

This disclosure relates generally to air handling in a heating, ventilation, and air conditioning (HVAC) system. More specifically, this disclosure relates to a filter rack assembly for filters disposed within a duct in an HVAC system.

In some embodiments, a filter rack assembly is described that is fixable in an interior space of a cabinet in an air-handling unit. In some embodiments, one or more air filters can be fixed to the filter rack assembly. In some embodiments, the one or more air filters can be high-efficiency particulate air (HEPA) filters. The one or more air filters can be fixed to a filter frame using one or more pressure brackets.

In some embodiments, the filter rack assembly can include a filter frame and a plurality of support members. The support members can, for example, include one or more vertical support members and one or more horizontal support members removably fixed to each other and/or to the filter frame. In some embodiments, the filter frame is disposed on an upstream side of the filter rack assembly and the support members are disposed on a downstream side of the filter rack assembly.

In some embodiments, the filter frame is a single piece of material having one or more cutouts for enabling airflow therethrough. A number of cutouts in the filter frame correspond to, for example, a number of air filters intended for use in the air-handling unit.

In some embodiments, the filter frame is a single piece of non-welded material having one or more cutouts for enabling airflow therethrough. For example, in some embodiments, the filter frame is a single piece of sheet metal having one or more cutouts therein.

The cabinet of the air-handling unit generally includes a roof panel, side panels, and a base panel, connected together, forming an interior space therein. At least one of the panels includes a recess into which a portion of the filter frame can be inserted. In some embodiments, a gasket is disposed within the recess when the filter frame is inserted into the recess. The recess can reduce fit issues between the filter frame and the interior space in the cabinet caused by, for example, manufacturing tolerances, or the like.

An assembly is disclosed. The assembly includes a filter frame including one or more cutouts for permitting airflow therethrough. The assembly further includes one or more vertical support members and one or more horizontal support members, wherein the one or more vertical support members and the one or more horizontal support members are fixed to a first side of the filter frame.

An air-handling unit is disclosed. The air-handling unit includes a cabinet having a top panel, base panel, and first and second side panels assembled together, thereby forming an interior space. The air-handling unit further includes a filter rack assembly including a filter frame including one or more cutouts for permitting airflow therethrough; and one or more vertical support members and one or more horizontal support members, wherein the one or more vertical support members and the one or more horizontal support members are fixed to a first side of the filter frame. The filter rack assembly is disposed in the internal space of the cabinet.

BRIEF DESCRIPTION OF THE DRAWINGS

References are made to the accompanying drawings that form a part of this disclosure and which illustrate embodiments in which systems and methods described in this specification can be practiced.

FIG. 2B is an exploded view of the filter rack assembly as shown in FIG. 2A.

Like reference numbers represent like parts throughout.

DETAILED DESCRIPTION

This disclosure relates generally to air handling in a heating, ventilation, and air conditioning (HVAC) system. More specifically, this disclosure relates to a filter rack assembly for filters disposed within a duct in an HVAC system.

As used herein, an air filter can, for example, include any of a variety of filters generally used in an HVAC system. In some embodiments, the air filter can be a high-efficiency particulate air (HEPA) filter, or the like. In general, to qualify as a HEPA filter, an air filter must remove 99.97% of particles having a size of 0.3 μm. A HEPA filter, as used herein, is not intended to be limiting to a particular size, material, or other limitation other than meeting the above-identified particle removal standard.

"Upstream," as used herein, is generally indicative of a location in an airflow that is relatively nearer to an air source than a downstream location. In context of the figures and description that follow, upstream generally refers to a location that is on an inlet side of an air-handling unit.

"Downstream," as used herein, is generally indicative of a location in an airflow that is relatively farther from an air source than an upstream location. In context of the figures and description that follow, downstream generally refers to a location that is on an outlet side of an air-handling unit.

Figure 1:
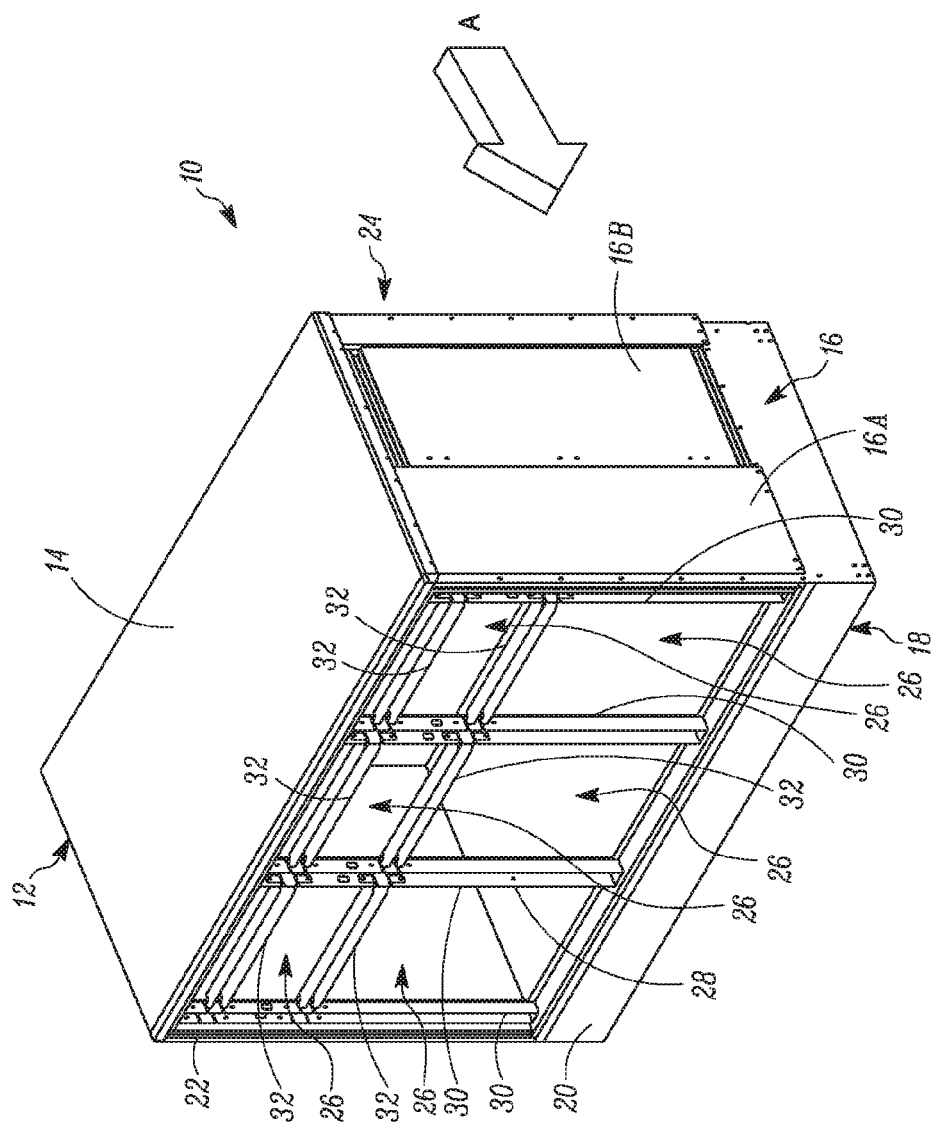
FIG. 1 illustrates an air-handling unit, according to some embodiments.

FIG. 1 illustrates an air-handling unit 10, according to some embodiments. It is to be appreciated that the air-handling unit 10 may generally be a part of a larger unit. In some embodiments, the air-handling unit 10 may be a standalone unit that is incorporated into a duct (not shown).

The air-handling unit 10 generally includes a cabinet 12. The cabinet 12 includes a top panel 14, a first side panel 16, a base panel 18, an outlet side 20, a second side panel 22, and an inlet side 24.

The inlet side 24 generally includes an inlet opening (not shown) through which airflow is introduced in the direction of arrow A. The arrow A is generally indicative of airflow through the cabinet 12 of the air-handling unit 10. It will be appreciated that the inlet opening can be a single opening or can include a plurality of openings. The design of the inlet opening is not intended to be limiting with respect to the air-handling unit 10.

In the illustrated embodiment, the first side panel 16 includes a plurality of panels 16A, 16B. It will be appreciated that the number of panels 16A, 16B can be varied. In general, the panels 16A, 16B can provide access to an interior space of the cabinet 12. Access to the interior space of the cabinet 12 can, for example, provide access to install one or more air filters (not shown in FIG. 1) in the interior space of the cabinet 12. It will be appreciated that the second side panel 22 can similarly include a plurality of panels (not shown), according to some embodiments. In some embodiments, either the first side panel 16 can include a plurality of panels 16A, 16B or the second side panel 22 can include a plurality of panels. In some embodiments, both the first side panel 16 can include a plurality of panels 16A, 16B and the second side panel 22 can include a plurality of panels. It will further be appreciated that in some embodiments, the first side panel 16 and the second side panel 22 can be a single panel which is removable in order to provide access to the interior space of the cabinet 12.

The outlet side 20 typically includes a full-face opening. A filter rack assembly 28 generally includes one or more outlet openings 26 through which air exits the cabinet 12. The illustrated outlet side 20 includes six openings 26. It will be appreciated that the number of openings 26 is dependent upon the particular air-handling unit 10 and air filter (not shown in FIG. 1) configuration. For example, the outlet side 20 can include fewer than six openings 26 in some embodiments. In some embodiments, the outlet side 20 can include more than six openings 26.

The cabinet 12 includes the filter rack assembly 28. The filter rack assembly 28 generally includes a plurality of vertical support members 30, a plurality of horizontal support members 32, and a filter frame 34 (see FIGS. 2A-2B). The filter rack assembly 28 is generally configured to support the one or more air filters within the cabinet 12. The vertical support members 30 and the horizontal support members 32 are generally arranged to form a lattice in order to provide structural support to the filter frame 34. The combination of the vertical support members 30 and the horizontal support members 32 provides structural rigidity to the filter frame 34, which allows for a planar sheet of material to be used for the filter frame 34. In some embodiments, the planar sheet of material for the filter frame 34 is a sheet of non-welded material. It will be appreciated that the frame 34 may be made of multiple layers or sheets constructed or formed into a planar like structure. In some applications, for example, in applications which require a relatively large air-handling unit 10, the filter frame 34 may still be made of more than one piece of material adhered (e.g., welded, connected with adhesive, etc.) together. In some embodiments, the filter rack assembly 28 can also include an outlet frame (not shown) which would be disposed on a downstream side of the support members 30, 32. In some embodiments, the outlet frame could be fixed to the support members 30, 32.

In some embodiments, the filter frame 34 can generally be a single piece of non-welded material (e.g., metal, plastic, or the like) from which material can be selectively removed according to the particular filter configuration for the air-handling unit 10. It will be appreciated that the particular material selected may be, for example, dependent upon one or more code requirements (e.g., building code, etc.). For example, in the illustrated embodiment, the filter frame 34 includes a single piece of material having six rectangular portions cutout. The filter frame 34 generally provides a substantially flat surface to which the one or more air filters may be sealingly engaged. Accordingly, the filter frame 34 is generally located on an upstream side of the vertical support members 30 and the horizontal support members 32. The filter frame 34 can be sized such that its edges are installable into recesses (not shown in FIG. 1) of the side panels 16, 22, the base panel 18, and the top panel 14. Additional details about the filter rack assembly are described in accordance with the remaining figures below.

Figure 2A:
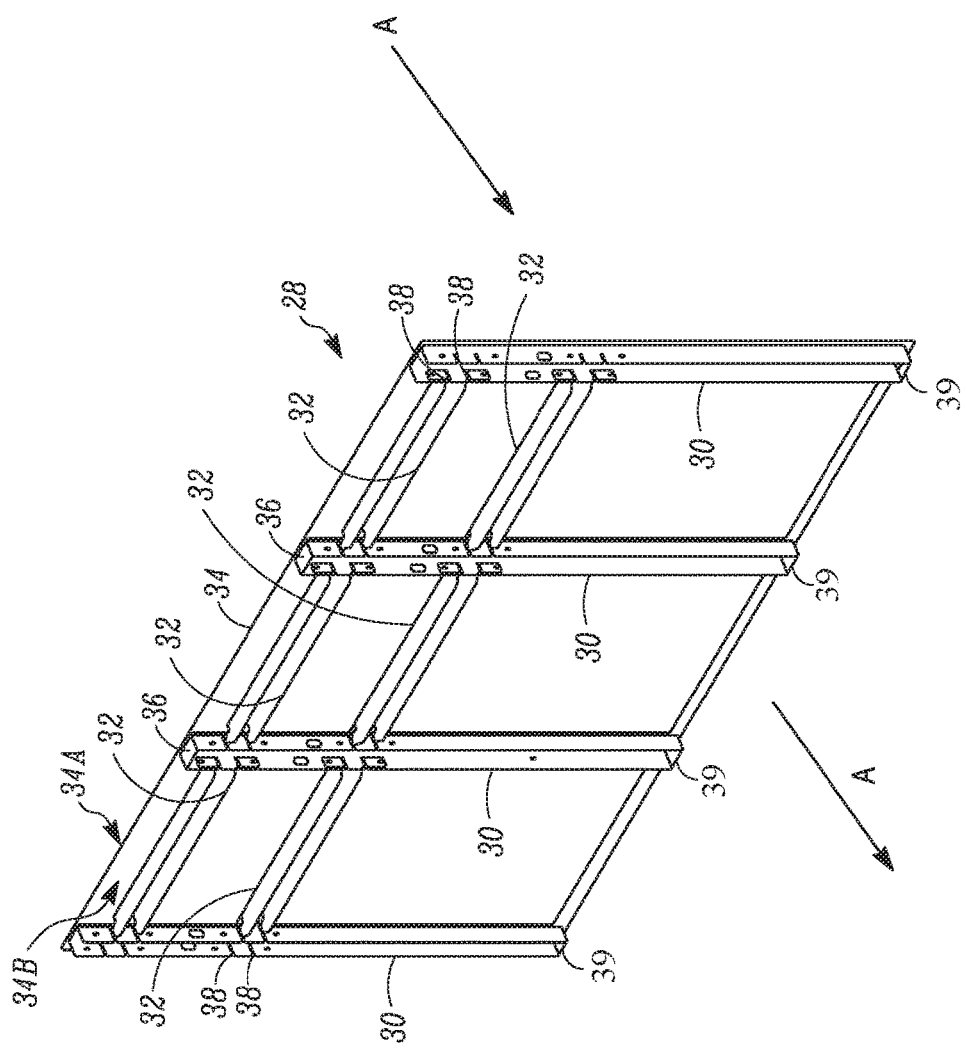
FIGS. 2A-2B illustrate a filter rack assembly, according to some embodiments.
Figure 2B:
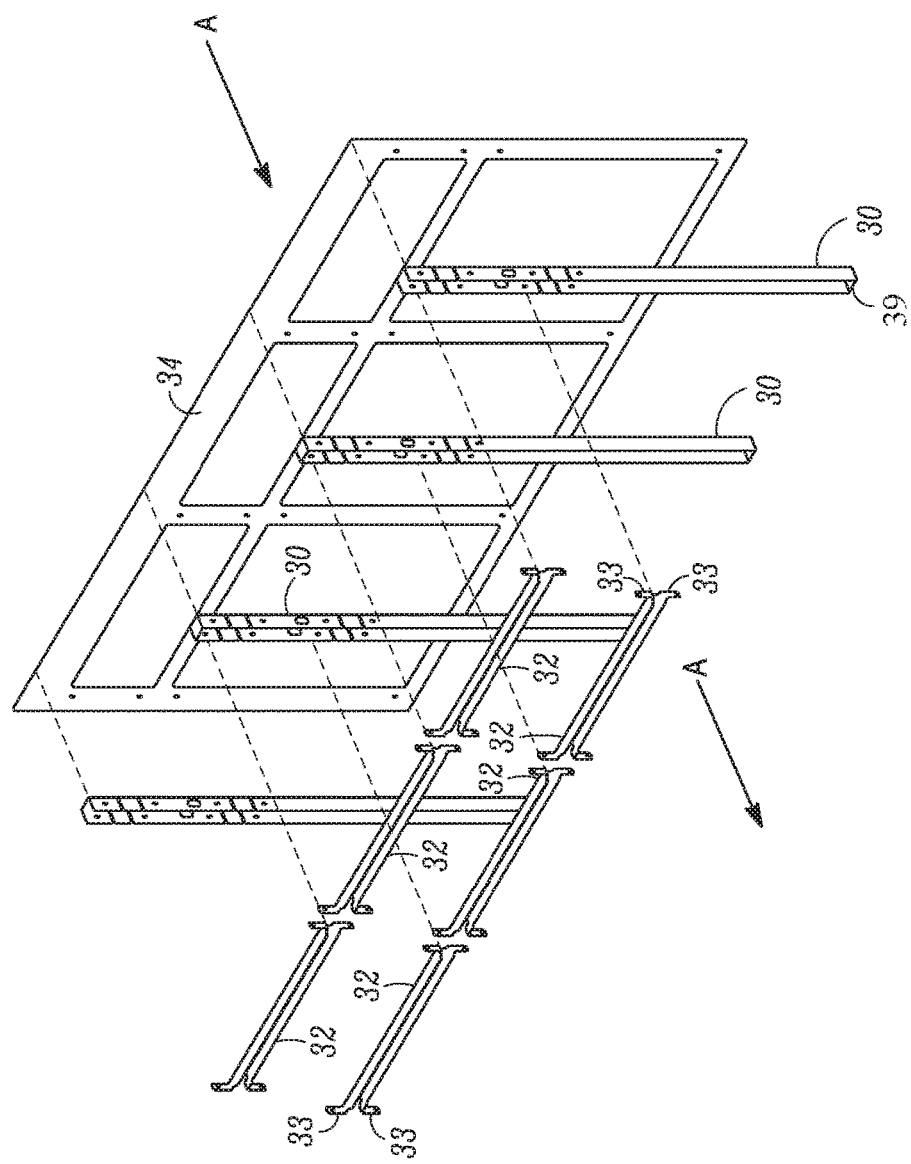

FIGS. 2A-2B illustrate the filter rack assembly 28, according to some embodiments. FIG. 2B is an exploded view of the filter rack assembly 28 as shown in FIG. 2A.

The filter rack assembly 28, as illustrated, is generally configured to include six outlets through which air can flow. Accordingly, each of the outlets is configured to receive an air filter (not shown in FIGS. 2A-2B). The air filters are fixed to an inlet side 34A of the filter frame 34. As in FIG. 1, the arrows A illustrate the airflow direction. The vertical support members 30 and the horizontal support members 32 are generally fixed to an outlet side 34B of the filter frame 34. While embodiments are generally discussed in the above configuration in which the air filters are fixed to the inlet side 34A of the filter frame 34 and the vertical support members 30 and horizontal support members 32 are fixed to the outlet side 34B of the filter frame 34, it will be appreciated that an embodiment in which the configuration is reversed is possible. In such embodiments, the air filters would be fixed to the outlet side 34B of the filter frame 34 and the vertical support members 30 and horizontal support members 32 would be fixed to the inlet side 34A of the filter frame 34. In some embodiments, the air filters may be fixed to the outlet side 34B of the filter frame 34, and the vertical support members 30 and horizontal support members 32 can be fixed to the outlet side 34B as well. In such embodiments, spacing of the support members 30, 32 may be modified to accommodate the air filters. In some embodiments, disposing the air filters on the inlet side 34A may compress the air filters into the filter frame due to airflow, and accordingly the support members 30, 32. This arrangement can, in some embodiments, be structurally stronger than embodiments in which the configuration is reversed, in which case the airflow would push the air filters away from the filter frame 34 and support members 30, 32.

The vertical support members 30 include a plurality of cutouts 38 disposed at a vertical location along each of the vertical support members 30 at which a horizontal support member 32 is to be fixed. The cutouts 38 are designed (e.g., size, location, etc.) such that an end portion of each of the horizontal support members 32 can be received in the cutouts 38. This can, for example, provide a lattice type support structure in which the vertical support members 30 and the horizontal support members 32 are mountable in a configuration that is substantially flush with the outlet side 34B surface of the filter frame 34. Such a configuration can, for example, provide additional structural support in both vertical and horizontal directions of the filter frame 34 which prevent the filter frame 34 from flexing when, for example, air flows through the air-handling unit 10. The horizontal support members 32 are insertable into the cutouts 38. The horizontal support members 32 may also include one or more mounting flanges 33. The one or more mounting flanges 33 can be used to removably fix the horizontal support members 32 to the vertical support members 30.

The vertical support members 30 and the horizontal support members 32 are generally removably fixed to the filter frame 34. In some embodiments, the support members 30, 32 are fixed to the filter frame using, for example, a combination of screws, nuts, bolts, or the like. In some embodiments, in order to provide a better seal and reduce introduction of airflow leaks in the filter rack assembly 28, the support members 30, 32 can be fixed to the filter frame 34 using a combination of lug bolts and flush nuts. It will be appreciated that the particular means used for fixing the support members 30, 32 to the filter frame 34 is not intended to be limiting. In some embodiments, the support members 30, 32 can be fixed to the filter frame 34 using a more permanent means than a screw-type connection. For example, in some embodiments, the support members 30, 32 can be welded, riveted, or the like to the filter frame 34. In some embodiments, an adhesive could be used to fix the support members 30, 32 to the filter frame 34. It will be appreciated that combinations of the above fastening means may be used in some embodiments. For example, a combination of adhesive(s) and fasteners may be used. In some embodiments, the adhesive can, for example, provide additional sealing benefits, thereby further reducing leak paths through which airflow can bypass the filter rack assembly 28.

As illustrated in FIGS. 2A-2B, one or more of the vertical support members 30 can include a flange 36. As shown, two of the four vertical support members 30 include flanges 36. It will be appreciated that more than two of the vertical support members 30 can include the flanges 36. Further, in some embodiments, fewer than two of the vertical support members 30 can include the flange 36. The flange 36 can provide a fixing surface for fixing the filter rack assembly 28 in the air-handling unit 10 (FIG. 1). More particularly, the flange 36 can be fixed to an inner surface of the top panel 14 of the air-handling unit 10. It will be appreciated that similar means as identified above for fixing the support members 30, 32 to the filter frame 34 are suitable for fixing the flange 36 to the inner surface of the top panel 14 of the air-handling unit 10.

The vertical support members 30 also include flanges 39 for fixing the vertical support members 30 to the base panel 18 of the air-handling unit 10 (FIG. 1). As illustrated, each of the four vertical support members includes a flange 39. It will be appreciated that fewer than all of the vertical support members 30 can include the flange 39, according to some embodiments.

Figure 3:
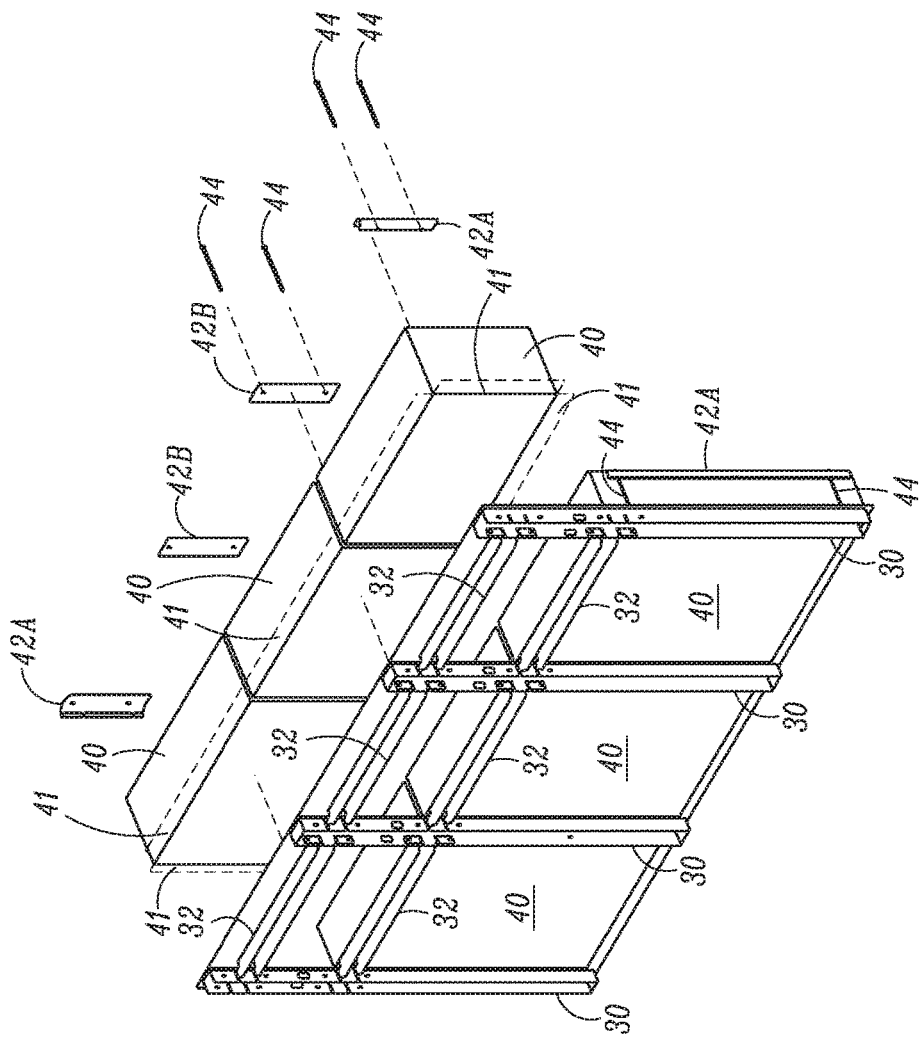
FIG. 3 illustrates a partially exploded view of filter rack assembly including filters, according to some embodiments.

FIG. 3 illustrates a partially exploded view of the filter rack assembly 28 including filters 40, according to some embodiments. In the illustrated embodiment, six filters 40 are included. It will be appreciated that in some embodiments fewer than six filters 40 can be included. Further, in some embodiments, more than six filters 40 can be included.

The air filters 40 are of two different sizes. The size of the air filters 40 corresponds to the size of the plurality of openings in the filter frame 34. It will be appreciated that the size and geometry of the filters 40 are intended as examples only. The size and geometry can vary, for example, based on a particular air-handling unit 10 (FIG. 1) in which the filter rack assembly 28 is to be installed. Each of the filters 40 can include a sealing member 41 on a downstream face of each of the filters 40. The sealing member 41 can provide a sealing engagement with an inlet side face of the filter frame 34 such that airflow substantially passes through the filters 40 and minimizes an amount of airflow that can bypass the filters 40. In some embodiments, this may be necessary in order to meet particulate removal standards (e.g., 99.97%) according to U.S. government standards. In some embodiments, some airflow bypassing the filters may be acceptable, in which case the filters 40 may not include the sealing member 41. In some embodiments, the filters 40 may not include the sealing member 41, but a sealing member can be disposed on an inlet side face of the filter frame 34. In some embodiments, neither the filter frame 34 nor the filters 40 include the sealing member 41.

The filters 40 are generally fixed to the filter rack assembly 28 using a combination of pressure brackets 42A, 42B and fasteners 44. As illustrated, in some embodiments, the filters 40 can be fixed to the filter rack assembly 28 using different configurations of pressure brackets 42A, 42B. For example, the pressure brackets 42A include multiple faces such that they can be fixed to a corner of the filters 40. In some embodiments, the pressure brackets 42A can be fixed to multiple faces of the filters 40. In some embodiments, the pressure brackets 42A can provide an additional mounting surface to fix the pressure bracket to, for example, a side (e.g., sides 16, 22) of the cabinet 12 (FIG. 1). The pressure brackets 42B can include a single face and be installed on a flat surface of the filters 40. It will be appreciated that in some embodiments, either the pressure brackets 42A or 42B will be used. The filters 40 are securely held against the inlet side 34A of the filter frame 34.

Figure 4:
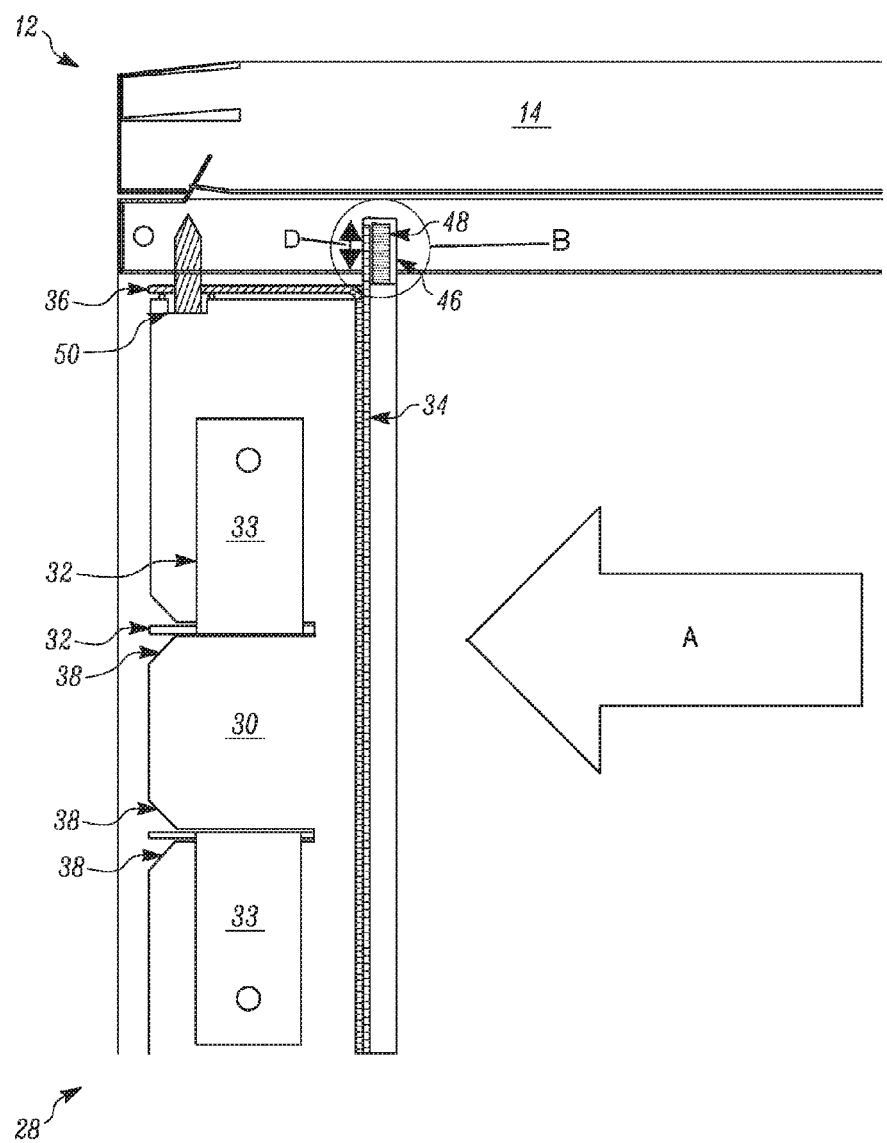
FIG. 4 illustrates a sectional view of the filter rack assembly, according to some embodiments.

FIG. 4 illustrates a sectional view of the filter rack assembly 28, according to some embodiments. In the illustrated figure, the airflow is in the direction A, which is generally from right to left.

As illustrated, one of the horizontal support members 32 is inserted into the cutouts 38 of the vertical support member 30. The mounting flanges 33 extend vertically upward and vertically downward from the cutouts 38. Each of the mounting flanges 33 include an aperture which is configured to receive a fastener in order to fix the horizontal support member 32 to the vertical support member 30. The vertical support member 30 is fixed to the top panel 14 via a screw 50 through the flange 36.

The top panel 14 includes a recess 46 which is configured to receive a portion of the filter frame 34. In some embodiments, the recess 46 can be a groove or the like. The recess 46 can, for example, reduce manufacturing costs of the filter frame 34. For example, the recess 46 provides additional area for receiving the filter frame 34. As a result, the filter frame 34 and the interior space of the cabinet 12 (FIG. 1) do not have to be the same dimensions. Accordingly, the manufacturing tolerances for both the cabinet 12 and the filter frame 34 do not have to be as precisely controlled because of the recess 46. In some embodiments, the recess 46 has a relatively small depth D. For example, the depth D can be at or about 1 inch. In some embodiments, the depth D can be less than 1 inch. In some embodiments, the depth D can be at or about 0.5 inches. In some embodiments, the depth D can be less than 0.5 inches. In some embodiments, the depth D can be between about 0.5 inches and about 1 inch. In some embodiments, the depth D can be greater than 1 inch. It will be appreciated that these ranges are intended to be exemplary, and that depth D can vary beyond the stated ranges in accordance with the principles of this specification. In particular, the depth D can vary such that the recess 46 can accommodate a gasket 48 and a portion of the filter frame 34 so long as the recess 46 is substantially fluidly sealed to prevent airflow therethrough. In general, the recess 46 is dimensioned such that manufacturing tolerances can be accounted for, but the recess 46 is relatively small enough that it is relatively easy to prevent the recess 46 from creating a leak path for the airflow to bypass the filters 40. In some embodiments, the recess 46 can provide for a fit that is relatively more fluid tight than, for example, a welded connection or the like between the filter frame 34 and the roof panel 14. In some embodiments, the recess 46 can also reduce an amount of time for assembling the filter rack assembly 28 in the cabinet 12 of the air-handling unit 10.

The gasket 48 can generally be inserted into the recess 46. The gasket 48 can, for example, provide a substantially fluid tight seal to prevent airflow from flowing through the recess 46 and bypassing the filters 40 (not shown in FIG. 4). In some embodiments, the gasket 48 can be held in the recess 46 by, for example, an adhesive, a press-fit between the filter frame 34, gasket 48, and roof panel 14, a combination of adhesive and a press-fit between the filter frame 34, gasket 48, and roof panel 14, or the like. It will be appreciated that the gasket 48 can, in some embodiments, be disposed on the filter frame 34 instead of being disposed in the recess 46. For example, the gasket 48 could be held on the filter frame 34 with, for example, adhesive.

Figure 5B:
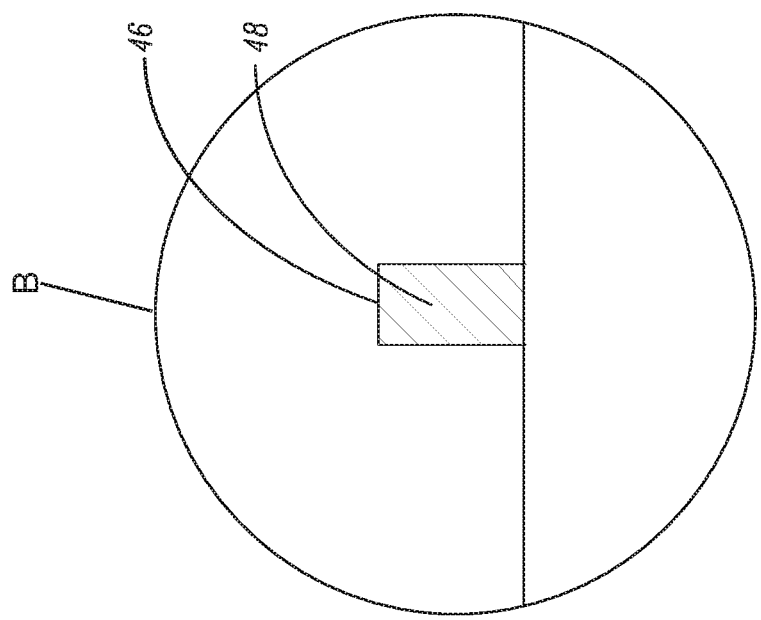
FIGS. 5A-5B illustrate a portion of the sectional view of the filter rack assembly from FIG. 4, according to some embodiments.
Figure 5A:
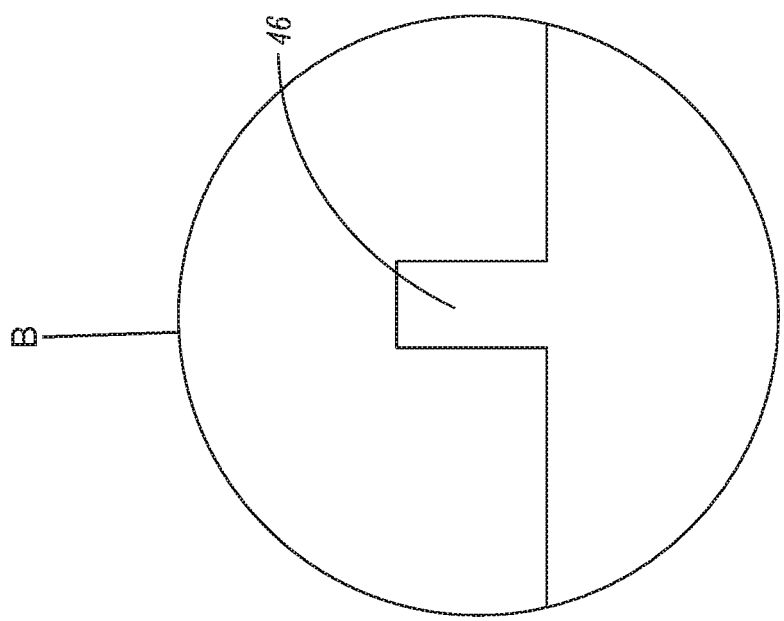

In some embodiments, the gasket 48 can fill all or substantially all of the recess 46 (see FIG. 5B). In such embodiments, the filter frame 34 can be inserted into the recess 46 and can, for example, form a sealing engagement with the gasket 48. In such an embodiment, the filter frame 34 can extend into the recess 46 and form a contact with the gasket 48, such that the gasket 48 is pushed (vertically upward in FIG. 5B) into the recess 46. In some embodiments, the filter frame 34 can, for example, cut through a portion of the gasket 48 such that the gasket 48 surrounds an end of the filter frame 34 which extends into the recess 46. In some embodiments, the gasket 48 can be secured to the filter frame 34, in which case the recess 46 may not have a gasket 48 until installation of the filter frame 34 (see FIG. 5A). In such an embodiment, the gasket 48 may be secured to an end of the filter frame 34 which extends into the recess 46.

Because of the recess 46, the filter frame 34 can be designed such that it is slightly larger than the opening in the cabinet 12 of the air-handling unit 10 (FIG. 1). The remaining panels of the cabinet 12 (e.g., side panels 16, 22, and base panel 18) can include recesses and gaskets similar to that shown in FIG. 4. In some embodiments, one or more of the panels (e.g., side panels 16, 22, and base panel 18) does not include the recess 46 or the gasket 48. In some embodiments, inclusion of the gasket 48 can provide additional compensation for variations in, for example, manufacturing tolerances or the like.

In some embodiments, in addition to the gasket 48, a sealant (e.g., silicone, etc.) can be applied to prevent the recess 46 from serving as a leak flow path for airflow to bypass the filters 40.

In some embodiments, inclusion of the recess 46 and the gasket 48 can provide for an installation of the filter rack assembly 28 into the cabinet 12 in which the filter rack assembly 28 is not welded to the cabinet 12. In some embodiments, the combination of the recess 36 and gasket 48 can provide a suitable fluid seal. In some embodiments, the combination of the recess 46 and the gasket 48 can reduce manufacturing time and costs by eliminating, for example, a welding step. In some embodiments, the inclusion of the recess 46 and the gasket 48 may allow for the filter rack assembly 28 to be removable and/or replaceable.

Aspects

It is to be appreciated that any one of aspects 1-8 can be combined with any one of aspects 9-17.

Aspect 1. An assembly, comprising:
a filter frame including one or more cutouts for permitting airflow therethrough; and
one or more vertical support members and one or more horizontal support members, wherein the one or more vertical support members and the one or more horizontal support members are fixed to a first side of the filter frame, the filter frame being configured to receive one or more air filters on a second side of the filter frame.

Aspect 2. The assembly according to aspect 1, further comprising one or more air filters fixed to the filter frame, wherein the one or more filters are fixed to the second side of the filter frame, the second side of the filter frame being opposite the first side of the filter frame.

Aspect 3. The assembly according to aspect 2, wherein the second side of the filter frame is disposed on an inlet side of the filter frame.

Aspect 4. The assembly according to any one of aspects 2-3, further comprising a plurality of pressure brackets, the plurality of pressure brackets being configured to fix the one or more air filters to the filter frame.

Aspect 5. The assembly according to any one of aspects 1-4, wherein at least one of the one or more vertical support members includes a flange disposed at an end of the vertical support member.

Aspect 6. The assembly according to any one of aspects 1-5, wherein the one or more vertical support members include a plurality of cutouts configured to receive an end of one of the one or more horizontal support members.

Aspect 7. The assembly according to aspect 6, wherein the one or more horizontal support members include flanges disposed at ends of the one or more horizontal support members, the flanges being configured to extend along one of the one or more vertical support members when the one or more horizontal members are in a configuration in which the ends are inserted into the plurality of cutouts of the vertical support members.

Aspect 8. The assembly according to any one of aspects 1-8, wherein the filter frame is formed of a single piece of material.

Aspect 9. An air-handling unit, comprising:
a cabinet having a top panel, base panel, and first and second side panels assembled together, thereby forming an interior space; and
a filter rack assembly, comprising:
a filter frame including one or more cutouts for permitting airflow therethrough;
one or more vertical support members and one or more horizontal support members, wherein the one or more vertical support members and the one or more horizontal support members are fixed to a first side of the filter frame, the filter frame being configured to receive one or more air filters on a second side of the filter frame,
wherein the filter rack assembly is disposed in the internal space of the cabinet.

Aspect 10. The air-handling unit according to aspect 9, wherein one or more of the top panel, base panel, and first and second side panels include a recess therein, the recess being configured to receive the filter frame.

Aspect 11. The air handling unit according to aspect 10, wherein a gasket is disposed within the recess to prevent airflow through the recess.

Aspect 12. The air-handling unit according to aspect 11, wherein the gasket is fixed within the recess.

Aspect 13. The air-handling unit according to any one of aspects 9-12, further comprising one or more air filters fixed to the filter frame, wherein the one or more filters are fixed to a second side of the filter frame, the second side of the filter frame being opposite the first side of the filter frame.

Aspect 14. The air-handling unit according to aspect 13, further comprising a plurality of pressure brackets, the plurality of pressure brackets being configured to fix the one or more air filters to the filter frame.

Aspect 15. The air-handling unit according to any one of aspects 9-14, wherein at least one of the one or more vertical support members includes a flange disposed at an end of the vertical support member.

Aspect 16. The air-handling unit according to aspect 15, wherein the filter rack assembly is fixed to the top panel of the cabinet at the flange.

Aspect 17. The air-handling unit according to any one of aspects 9-16, wherein a gasket is disposed within the recess and fills the recess.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed, and the shape, size, and arrangement of parts, without departing from the scope of the present disclosure. The word "embodiment," as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. An assembly, comprising:
   a filter frame including one or more cutouts for permitting airflow therethrough, the filter frame having a first side and a second side that is opposite the first side;
   one or more vertical support members and one or more horizontal support members, wherein the one or more vertical support members and the one or more horizontal support members are fixed to the first side of the filter frame;
   one or more air filters fixed to the second side of the filter frame;
   a plurality of pressure brackets, the plurality of pressure brackets disposed on a side of the one or more air filters facing away from the filter frame, each pressure bracket of the plurality of pressure brackets including a flat surface for contacting a surface of the one or more air filters; and
   a plurality of fasteners, wherein the plurality of fasteners extend through the plurality of pressure brackets and the one or more air filters to secure the one or more air filters to the filter frame.

2. The assembly according to claim 1, wherein the second side of the filter frame is disposed on an inlet side of the filter frame.

3. The assembly according to claim 1, wherein at least one of the one or more vertical support members includes a flange disposed at an end of the vertical support member.

4. The assembly according to claim 1, wherein the one or more vertical support members include a plurality of cutouts configured to receive an end of one of the one or more horizontal support members.

5. The assembly according to claim 4, wherein the one or more horizontal support members include flanges disposed at ends of the one or more horizontal support members, the flanges being configured to extend along one of the one or more vertical support members when the one or more horizontal members are in a configuration in which the ends are inserted into the plurality of cutouts of the vertical support members.

6. The assembly according to claim 1, wherein the filter frame is formed of a single piece of material.

7. An air-handling unit, comprising:
   a cabinet having a top panel, base panel, and first and second side panels assembled together, thereby forming an interior space; and
   a filter rack assembly, comprising:
      a filter frame including one or more cutouts for permitting airflow therethrough, the filter frame having a first side and a second side that is opposite the first side;
      one or more vertical support members and one or more horizontal support members, wherein the one or more vertical support members and the one or more horizontal support members are fixed to the first side of the filter frame;
      one or more air filters fixed to the second side of the filter frame;
      a plurality of pressure brackets, the plurality of pressure brackets disposed on a side of the one or more air filters facing away from the filter frame, each pressure bracket of the plurality of pressure brackets including a flat surface for contacting a surface of the one or more air filters; and
      a plurality of fasteners, wherein the plurality of fasteners extend through the plurality of pressure brackets and the one or more air filters to secure the one or more air filters to the filter frame,
      wherein the filter rack assembly is disposed in the internal space of the cabinet.

8. The air-handling unit according to claim 7, wherein one or more of the top panel, base panel, and first and second side panels include a recess therein, the recess being configured to receive the filter frame.

9. The air-handling unit according to claim 8, wherein a gasket is disposed within the recess, and an end of the filter frame extends into the recess and forms a sealing engagement with the gasket.

10. The air-handling unit according to claim 8, wherein a gasket is disposed within the recess and fills the recess.

11. The air handling unit according to claim 8, wherein a gasket is disposed within the recess to prevent airflow through the recess.

12. The air-handling unit according to claim 11, wherein the gasket is fixed within the recess.

13. The air-handling unit according to claim 7, wherein at least one of the one or more vertical support members includes a flange disposed at an end of the vertical support member.

14. The air-handling unit according to claim 13, wherein the filter rack assembly is fixed to the top panel of the cabinet at the flange.

15. The assembly according to claim 1, wherein the filter frame is a planar sheet of material.

16. The air-handling unit according to claim 7, wherein the filter frame is a planar sheet of material.

17. The air-handling unit according to claim 7, wherein one or more of the top panel and the base panel include a recess,
　　wherein a height of the filter frame is relatively larger than a distance from the base panel to the top panel,
　　and the filter frame is inserted into the recess when assembled.

\* \* \* \* \*